250-203. R OR 3539814 EX
Nov. 10, 1970 R. L. LILLESTRAND ET AL 3,539,814
STAR RECOGNITION APPARATUS WITH AN OPTICAL SCANNING DISC
Filed April 3, 1967 4 Sheets-Sheet 1
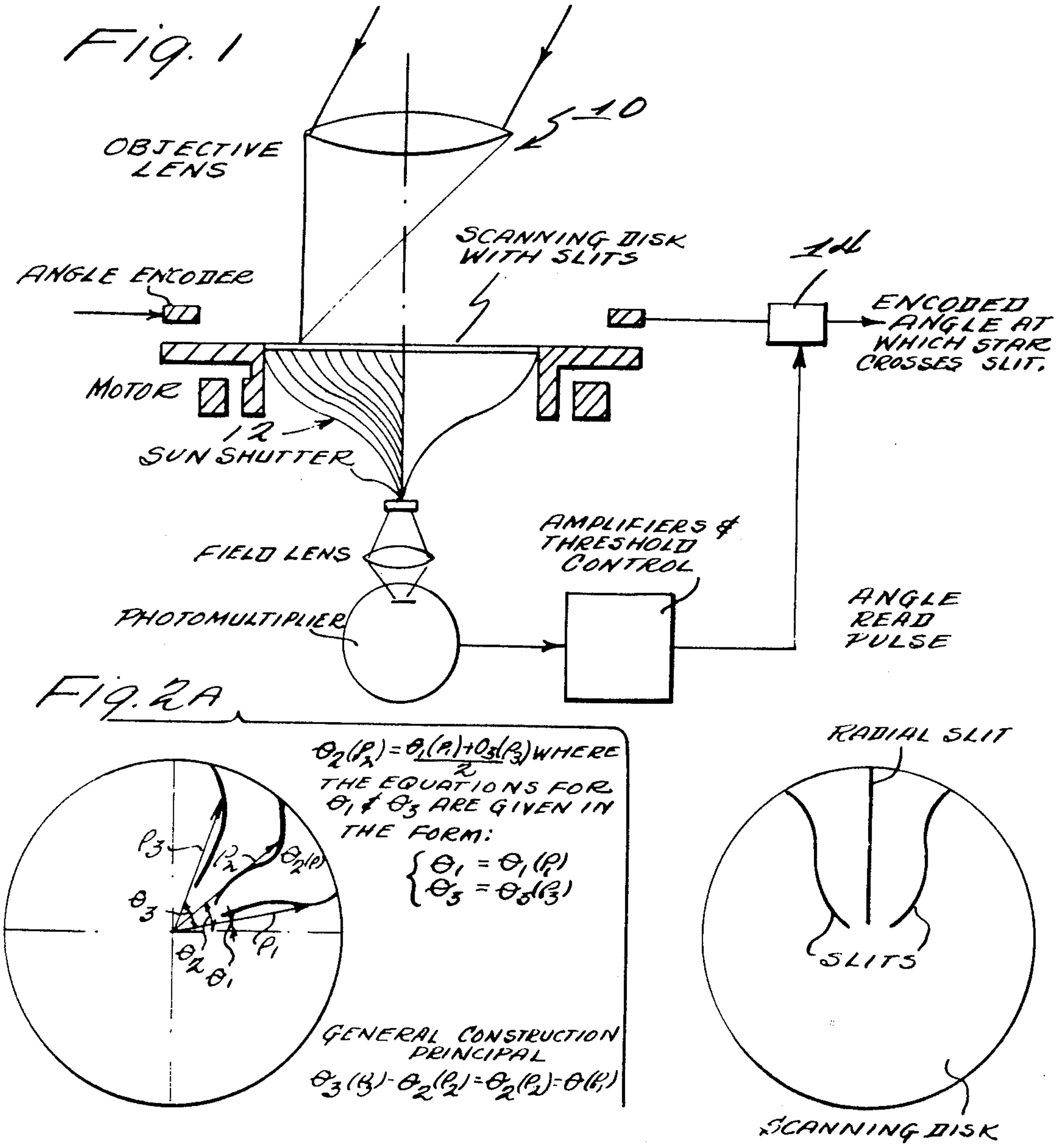
Fig. 1 Fig. 2A
Fig. 2B
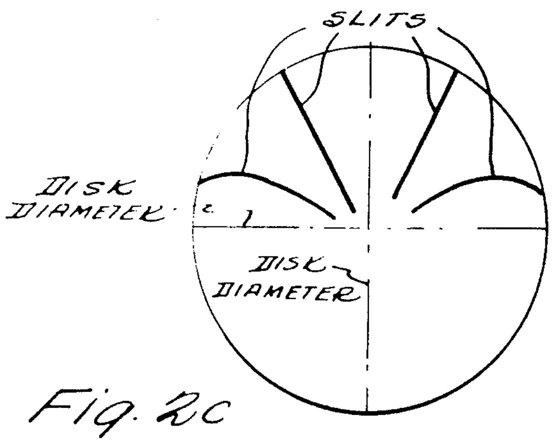
Fig. 2C
INVENTORS
ROBERT L. LILLESTRAND
LAWRENCE D. KANE
BRUCE D. VANNELLI
BY
Cushman, Darby & Cushman
ATTORNEYS INVENTORS
ROBERT L. LILLESTRAND
LAWRENCE D. KANE
BRUCE D. VANNELLI
BY Cushman, Darby & Cushman
ATTORNEYS

STAR RECOGNITION APPARATUS WITH AN OPTICAL SCANNING DISC

Filed April 3, 1967 4 Sheets-Sheet 3

INVENTORS
ROBERT L. LILLESTRAND
LAWRENCE D. KANE
BRUCE D. VANNELLI
BY
Cushman, Darby & Cushman
ATTORNEYS

STAR RECOGNITION APPARATUS WITH AN OPTICAL SCANNING DISC

Filed April 3, 1967 4 Sheets-Sheet 4

INVENTORS
ROBERT L. LILLESTRAND
LAWRENCE D. KANE
BRUCE D. VANNELLI
BY Cushman, Darby & Cushman
ATTORNEYS United States Patent Office 3,539,814

Patented Nov. 10, 1970

3,539,814

STAR RECOGNITION APPARATUS WITH AN OPTICAL SCANNING DISC

Robert L. Lillestrand, Edina, Lawrence D. Kane, St. Paul, and Bruce D. Vannelli, Savage, Minn., assignors to Control Data Corporation, Minneapolis, Minn., a corporation of Minnesota Filed Apr. 3, 1967, Ser. No. 627,762
Int. Cl. G01d *5/36;* G01j *1/06*
U.S. Cl. 250—203 8 Claims

ABSTRACT OF THE DISCLOSURE

An arrangement for determining the orientation of a vehicle in space by directing a scanning disk having slits therein towards a star field and providing relative rotation between the disk and the field. Incident radiation passing through the slits is utilized in conjunction with rotational information as data from which polar coordinates of stars in the field of view can be calculated. This in turn permits the angular separations between stars to be calculated. By comparing this angular separation information with known star separations, the actual identity and position of the stars are ascertained and the three axis orientation of the space vehicle can be determined.

The present invention pertains to a geometric pattern recognition system and particularly to an arrangement for recognizing a star pattern from which the orientation of a space vehicle can be determined. Such orientation knowledge is required for the autonomous navigation of the vehicle.

In the past, space vehicle orientation has been determined in a number of ways. One method has been by the so-called star-tracking technique in which complex sensing equipment has locked onto specific stars in order to develop sufficient data to determine space vehicle orientation. It has also been recognized that measuring spectral properties of stars in order to determine their positions is very difficult. Accordingly, other prior efforts have been directed to utilization of the premise, upon which the present invention is based, that the geometry of stars is invariant to a high degree of accuracy. As an example of such prior art efforts, image orthicon tubes have been employed in conjunction with optical systems having various fields of view to recognize a pattern of stars. However, such systems have presented problems due to the limited range of accuracy of the tubes with respect to the field of view necessary to observe a geometric pattern. Another approach has been the use of a mosaic of light sensitive detectors. However, such systems inherently have resolution deficiencies and have therefore not been competitive with other types of systems, such as star trackers.

It is therefore a principal object of the invention to recognize celestial geometric patterns by an arrangement in which no initial assumptions regarding sensor orientations, and no target intensity measurements, are required.

Another object is to provide an arrangement which can identify signal pulses generated by an identifiable star in the presence of large numbers of noise pulses, thereby permitting operation at relatively low signal-to-noise ratios.

A further object of the invention is to provide an arrangement which discriminates against false targets, such as airplanes, satellites, and the like, and which rejects star transit data which contains errors exceeding a preassigned amount.

Briefly, the invention comprises a scanning disk having three or more slits therein. The disk is associated with an optical system such that on directing the optics towards a star field, and rotating the disk relative to the star field, radiation falls on the disk. The incident radiation is passed through the slits onto a sensing element, such as a photomultiplier. The electrical information generated by the sensing element is utilized in conjunction with rotational information to identify star positions. By then calculating the angular separation between at least two stars, the orientation of the scape vehicle with which the disk is associated is determinable.

The invention will become more fully apparent when considered in light of the following description of preferred embodiments of the invention and from the appended claims.

The invention may be best understood by reference to the accompanying drawings, wherein:

FIG. 1 is a schematic drawing illustrating the basic elements of a sensor for use in recognizing a geometric star pattern;

FIGS. 2A–2C are schematic drawings illustrating several slit configurations which may be utilized in practicing the invention;

Figure 3:
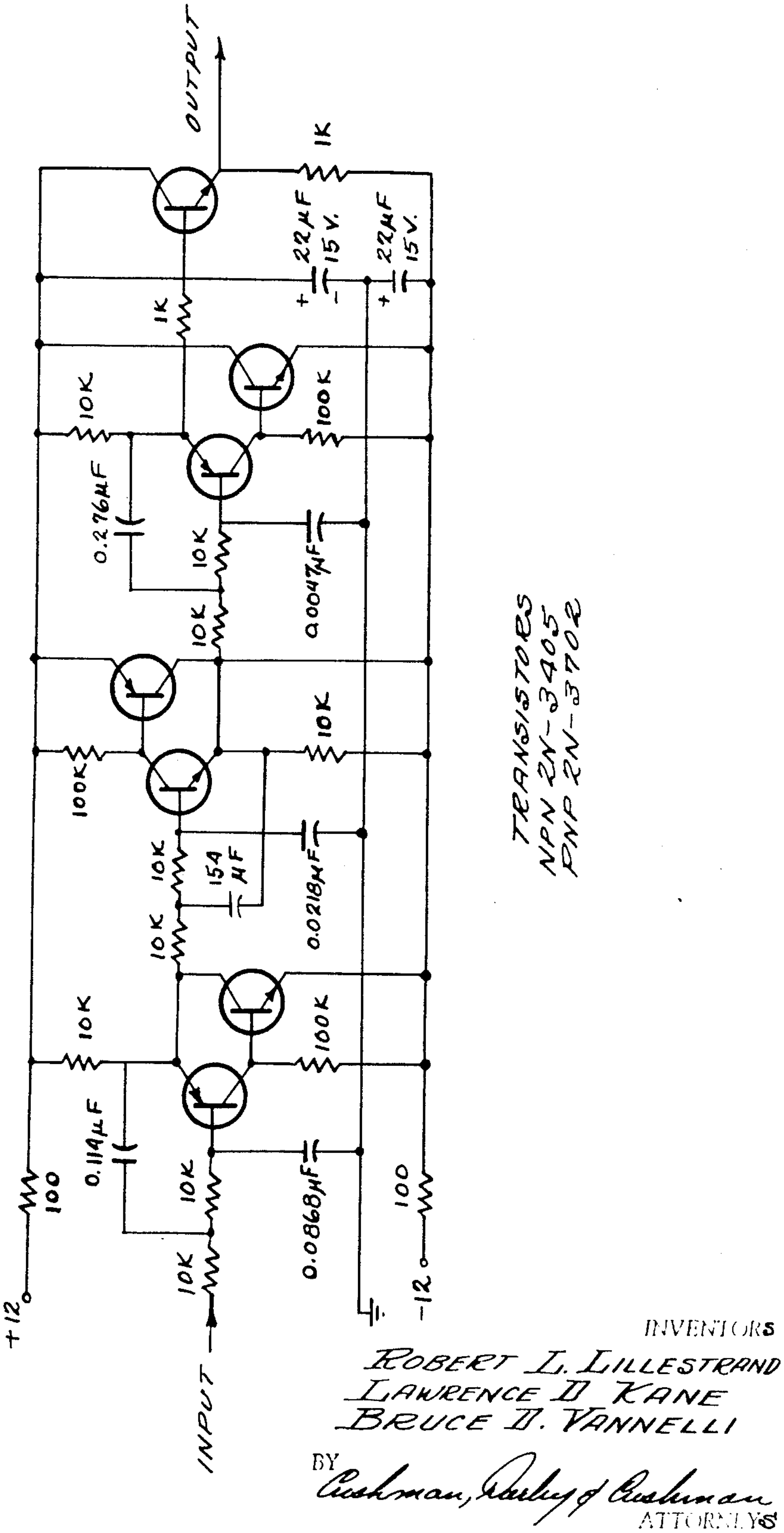
FIG. 3 is a schematic circuit diagram of a low pass filter which may be utilized with the sensor of FIG. 1 to filter the photomultiplier output.

Referring now to the drawings, the invention will be described in detail. FIG. 1 illustrates a sensor arrangement which may be employed to scan a star field to develop information from which the orientation of a space vehicle with which the sensor is associated can be determined. More particularly, the sensor includes an optical system 10 for focusing radiation from stars and the like on a rotating scanning disk having three or more slits. The radiation which passes through the slits is optically directed, as for example by optical fibers 12, through a sun shutter and field lens onto an electrical signal generating means, typically a photomultiplier, which produces an electrical output related in magnitude to the amount of radiation incident on the photomultiplier. This incident radiation is, of course, a function of the size and brightness of the source, as well as the slit width and speed of the scanning disk. The electrical output from the photomultiplier is directed to conventional amplifiers and a threshold control device to produce an output therefrom when the level of the threshold control device is exceeded. This output is called an angle read pulse for the reason which will now be described. The rotating disk is also provided with an angle encoder which constantly monitors the angular rotative position of the disk. When an angle read pulse is generated, the encoder reading is passed through gate 14 and is recorded.

The foregoing structure assumes the space vehicle is randomly oriented. Therefore, relative rotation between the sensor and the star field is obtained by rotating the scanning disk. However, such rotation means are unnecessary if the space vehicle is spinning. Of course, in the latter case, information as to the vehicle's rotation is required. Convenience may dictate that such information be provided using a clock pulse arrangement.

Now that the overall structure of the sensor has been outlined, details of those portions of the sensor which are not conventional will be described. As stated previously, the scanner disk may have three or more slits. Three slits are required to enable the solution of the completely general problem wherein the space vehicle is randomly oriented. The system described herein has an advantage over previous two-slit systems in that two-slit systems cannot distinguish between a particular target and other targets or backgrounds. Thus, the two-slit system is only useful in limited situations. Therefore, a three (or more) slit system is capable of distinguishing particular targets without requiring that intensity be measured. This will become apparent hereinafter when the overall system operation is discussed. At this point, several disk configurations having three or more slits will be desscribed, and the rules regulating the formation of these slits will be presented.

FIG. 2A illustrates a scanning disk having three complex slits. These slits have a definite relationship with respect to one another. At a distance $\rho$ from the center of the scanning disk to each of the slits, for any point along the slits, the following equation applies:

$$\theta_2(\rho_2)=\frac{\theta_1(\rho_1)+\theta_3(\rho_3)}{2}$$

or $$\theta_3(\rho_3)-\theta_2(\rho_2)=\theta_2(\rho_2)-\theta_1(\rho_1)$$

Other methods for locating slits are shown in FIGS. 2B and 2C. Here a slit configuration is selected for which a diameter through the center of the scanning disk serves as a reference, and the slits on one side of this diameter are the mirror image of those on the other side.

If a radial slit lies along the diameter, as shown in FIG. 2B, a minimum of two other non-radial slits, symmetrical with respect to the radial slit, are required on opposite sides of the radial slit.

If no radial slit lying along the diameter is used, a minimum of four slits is required, and these slits must be symmetrical with respect to a scanning disk diameter. Such an arrangement is illustrated in FIG. 2C.

Most important to the successful operation of the invention is the control of the output from the photomultiplier. It is apparent that the photomultiplier responds to all radiation directed thereto including, for example, stellar background radiation, photonoise from the stars and background, and internally generated noise such as photomultiplier dark current.

All types of incident radiation, as well as the photomultiplier dark current, have high frequency noise components of 100 kilohertz to 10 megahertz. Since the signal noise does not exceed one millisecond in duration, a significant improvement in the signal-to-noise ratio can be obtained by using a low pass filter at the output of the photomultiplier. Nominally, the cutoff frequency is between 500 hertz and 2 kilohertz. The resulting reduction in noise is achieved without distorting the signal.

The stellar background also has a noise component the power spectrum of which coincides with the signal spectrum. This is a scanning noise that results from scanning the galactic background of weak stars. This noise cannot be eliminated by filtering, but it can be reduced if the detection threshold is selected carefully. In this way, the photomultiplier output is processed only when its amplitude exceeds a preassigned threshold. When this happens, the location of the star pulse is estimated by differentiating the pulse and detecting its zero crossing. An alternate method is to average two crossings of the detection threshold.

A low frequency noise component results from variations in ambient background radiation over the sky. This can change by as much as an order of magnitude. Consequently, the photomultiplier output has a low frequency component the period of which equals the scan period, 1 to 20 seconds. Since detection is based on threshold crossings, this low frequency component can be eliminated with a floating detection threshold.

Figure 4:
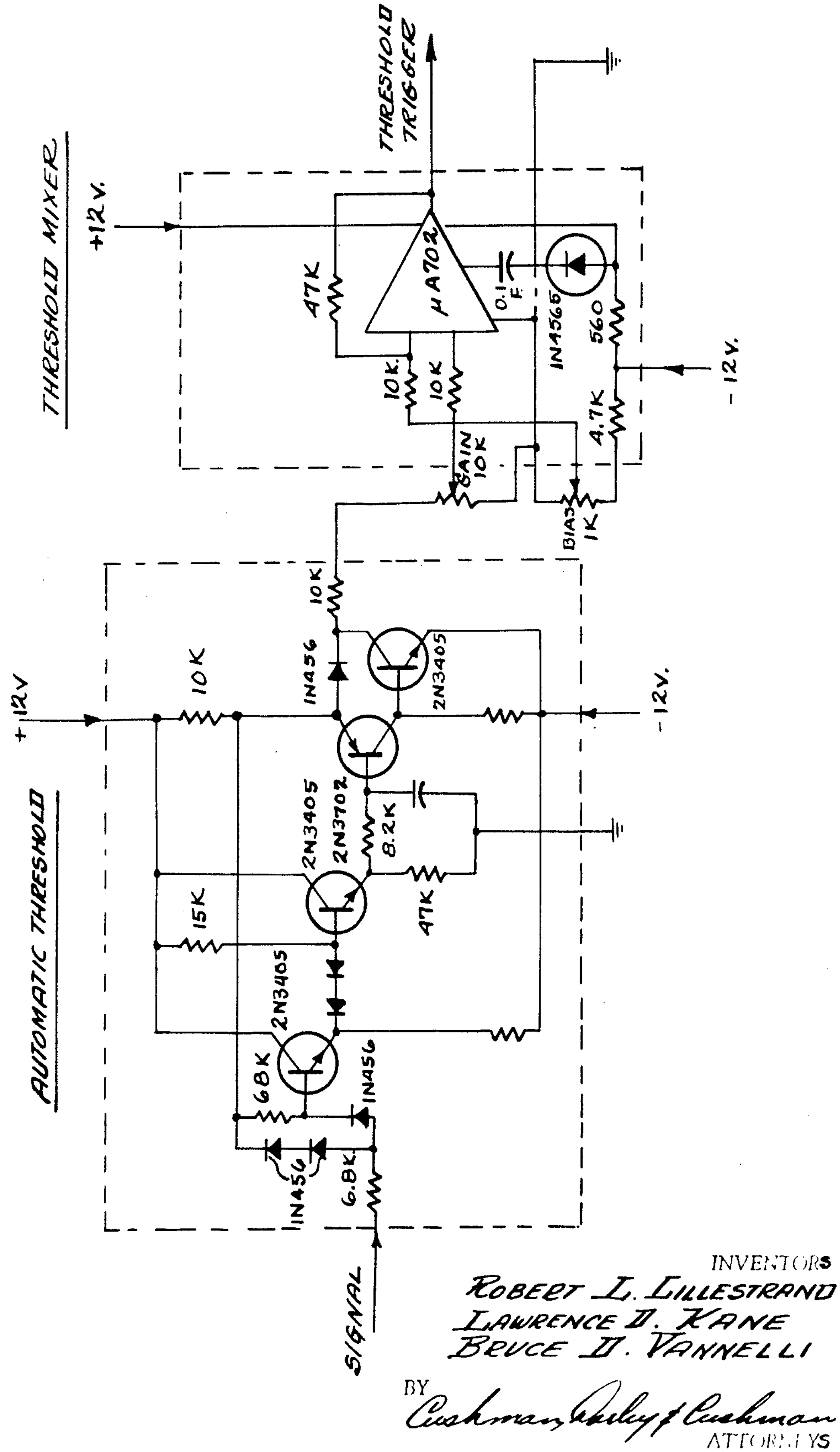
FIG. 4 is a schematic circuit diagram of a threshold control arrangement which may be used in the sensor shown in FIG. 1.

The foregoing is accomplished by circuits such as those shown in FIGS. 3 and 4. FIG. 3 represents an active low pass filter the output of which is applied as the input of the threshold circuit illustrated in FIG. 4. The component values are included as being typical of such circuits.

Detection based on a threshold crossing permits the greatest probability of detecting any bright start for a given risk of incorrect detection. Also, the time of the peak value of the detected star pulse is the time when the star is most likely to be centered in the slit. The system is capable of achieving an angle interpolation of one-tenth to one-twentieth of the star image size in the focal plane. This permits the system to achieve the required accuracy, even with relatively inexpensive optics.

Now that the details of the sensor have been presented, its function in providing data from which orientation of a space vehicle may be determined will be described. It is assumed that the vehicle is not on an orbital platform, and therefore, a plurality of slits are required.

Figure 5:
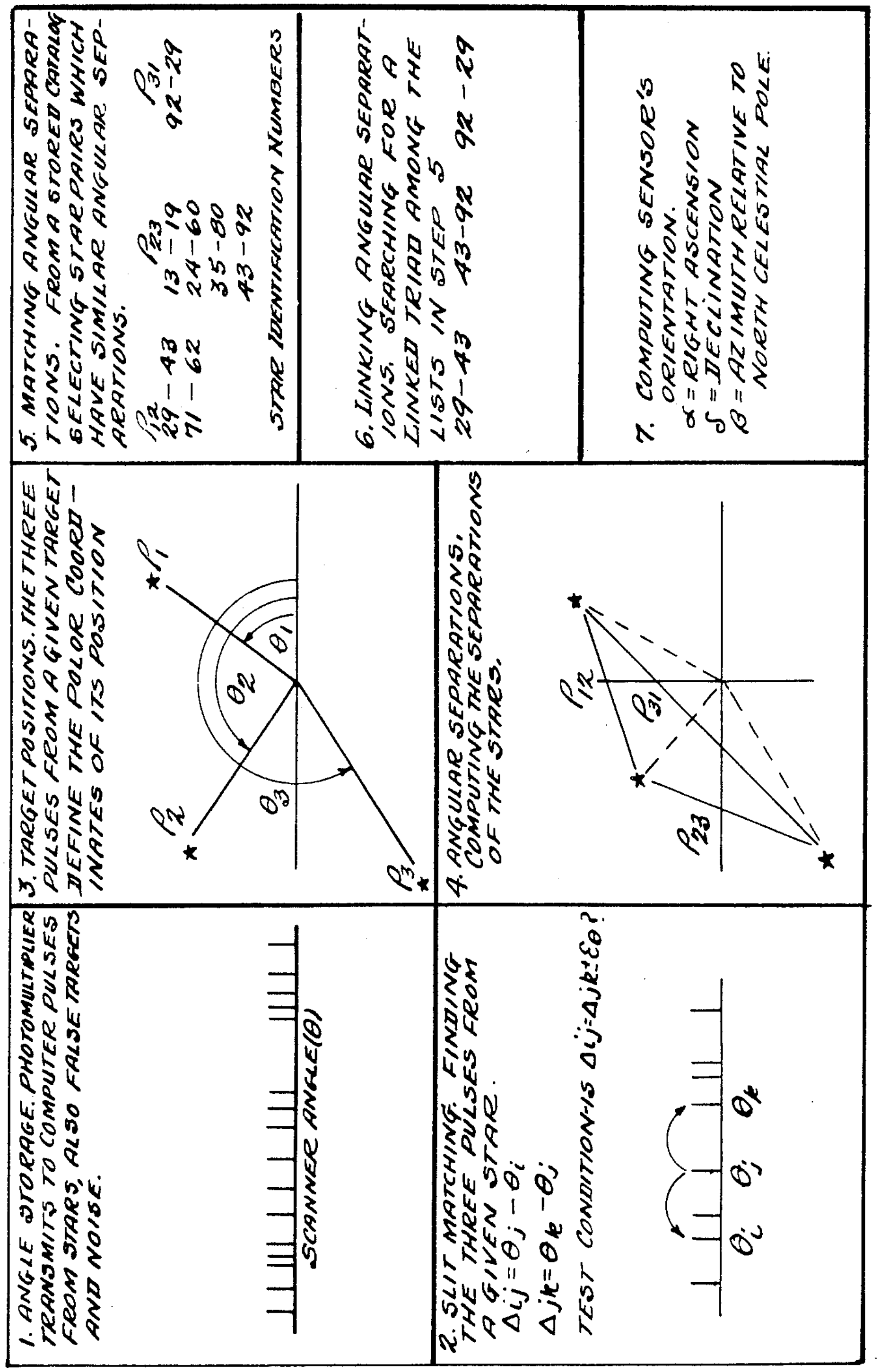
FIG. 5 is a table schematically illustrating the steps involved in pattern recognition.

FIG. 5 diagrammatically illustrates an arrangement which is a preferred case wherein three stars are detected so as to permit orientation to be established by a triangulation process. It has been found that whereas only two stars are theoretically necessary to permit orientation to be determined, extreme accuracy in measurement of the stars' angular separation is required. Using three stars, the accuracy of measurement is much less critical and therefore is more practical. If, however, the appropriate pointing direction of the sensor is known, it is possible to determine orientation with only two detected stars.

Step 1 illustrates the output of the photomultiplier comprising signals generated by radiation from stars, background noise, dark current, planets, airplanes, satellites, and the like.

The preferred embodiment of the invention utilizes a scanning disk of the type described with reference to FIGS. 2A and 2B. Consequently, each star which is detected by the three slits produces pulses at two equally spaced intervals designated as $\Delta ij$ and $\Delta jk$. Following the rule that:

$$\Delta ij=\Delta jk\pm\epsilon_0$$

where $$\Delta ij=\theta j-\theta i$$

$$\Delta jk=\theta k-\theta j$$

and $$\epsilon_0<<\Delta ij,\ \Delta jk$$

where $\epsilon_0$ is the maximum tolerable difference between $\Delta ij$ and $\Delta jk$, and is determined empirically. Any three pulses which come within the rule are considered as representing a potential target star. Thus, by examining the angular measurements passed by gate 14 for each of the three pulses, and using these measurements as a basis for a computation, the polar coordinates of the target can be calculated. This technique eliminates most noise which may have passed the sensors' screen-out structure and rejects star transit pulses having unacceptably large angular errors. The foregoing steps are illustrated as numbers 2 and 3 in FIG. 5.

Repeating this procedure for the remaining two targets provides sufficient polar coordinate data from which angular separations of the targets can be computed. With this information, matching of the calculated separations with those provided in a star catalog is undertaken. The matches hicles which may have otherwise coincidentally qualified are examined for a linked triad. This linking process eliminates noncelestial targets such as other space veas true star targets. Having identified a triad of identifiable stars, their actual positions can be determined from the star catalog and the three axes of the space vehicle's orientation ascertained. The steps of determining matching and linking angular separations to determine orientation are illustrated as steps 4–7 in FIG. 5. The comparisons and calculations described with reference to steps 1 through 7 of FIG. 5 are sufficiently complex to warrant the assistance of a general purpose computer having star catalogs stored therein and suitable programming for the matching and calculating involved.

In carrying out the foregoing operation, a number of variables are involved. For example, it is possible that a triad of targets may not be found if the error margins for the comparisons are too limited. In such a case, a factor such as $\epsilon_\theta$ should be enlarged. If an ambiguity of triads occurs, the angular separation error margin should be reduced.

The scanning disk itself should be provided with narrow slits. It has been found that the position of star targets can be found to an accuracy of at least $1/20{,}000$ of the field of view of the optical system associated with the sensor. This permits the use of optics having more than a 30° field of view without significantly deteriorating the accuracy of the overall system. Of course, in determining the slit width, it is necessary to allow for sufficient photons to pass the slit in order to obtain meaningful outputs from the photomultiplier. One parameter which may be adjusted to achieve this objective is the speed of rotation of the disk.

Although the present system has been described with reference to a space application, it should also be appreciated that the techniques disclosed may have utility in other environments. For example, if a photographic plate were used for permanent high density binary storage, then each opaque bit would appear in the same way as would a star at the focal surface of the optical system. The principal structural difference in the sensor would be that the optical system would be focused at a relatively close distance for the photographic plate, as opposed to infinity for scanning a star field. Thus, a geometric pattern of information on a photographic film could be recognized.

The above-described embodiments are illustrative of preferred embodiments of the invention but are not intended to limit the possibilities of insuring the features of accurate geometric pattern recognition obtainable without reliance on the intensity of the radiation sources. The embodiments disclosed herein are examples of arrangements in which the inventive features of this disclosure may be utilized, and it will become apparent to one skilled in the art that certain modifications may be made within the spirit of the invention as defined by the appended claims.

What is claimed is:

1. A method for recognizing a geometric pattern, comprising the steps of:

(a) directing an optical system toward a field of radiation to form a radiation pattern upon a scanning disk having at least three slits therein;

(b) providing relative rotation between the disk and the radiation field;

(c) directing radiation from the field through said slits to an electrical signal generating means which responds to incident radiation applied thereto from the radiation sources to develop output pulses each time radiation from a source impinges on said signal generating means;

(d) recording information representative of the relative angular position between the disk and the field whenever an output pulse is generated;

(e) matching recorded angular informations to determine at least two equally spaced angular separations;

(f) calculating, from the recorded angular informations from which equally spaced separations are found, coordinates of a radiation source which has caused the recording of such informations;

(g) repeating steps (e) and (f) for at least one more source;

(h) computing the separations between the sources for which the coordinates are calculated; and (i) matching the computed separations with known separations of identifiable sources to determine the identity of the sources for which coordinates have been calculated.

2. A method for recognizing a geometric star pattern for which the orientation of a vehicle in space can be determined, comprising the steps of:

(a) directing an optical system towards a star field to form a star field pattern upon a scanning disk having at least three slits therein;

(b) providing relative rotation between the disk and the star field;

(c) directing radiation from the star field through said slits to an electrical signal generating means which responds to incident radiation applied thereto from the stars to develop output pulses each time star radiation impinges on said signal generating means;

(d) recording information representative of the relative angular position between the disk and the star field whenever an output pulse is generated;

(e) matching recorded angular informations to determine at least two equally spaced angular separations;

(f) calculating from the recorded angular informations from which equally spaced separations are found polar coordinates of a star which has caused the recording of such informations;

(g) repeating steps (e) and (f) for at least one more star;

(h) computing the angular separations between the stars for which polar coordinates have been calculated; and (i) matching the computed angular separations with known angular separations of identifiable stars to determine the identity of the stars for which polar coordinates have been calculated.

3. A method for recognizing a geometric star pattern as set forth in claim 2, wherein step (g) is: repeating steps (e) and (f) for at least two more stars.

4. In an optical scanning device having an optical system, a rotatable scanning disk, a radiation sensing means, and a means for correlating the angular position of the rotatable scanning disk with the pattern of radiation received by the optical system, the improvement comprising:

the rotatable scanning disk having at least three slits wherein the angular separation between a first pair of said slits at any arbitrary radial distance is identical to the angular separation between a second pair of said slits at the same radial distance.

5. An apparatus as set forth in claim 4, having only three slits, wherein only one of said three slits extends radially from the center of said disk.

6. An apparatus as set forth in claim 4, wherein three of said slits are defined by the formula:

$$\theta_2(\rho_2)=\frac{\theta_1(\rho_1)+\theta_3(\rho_3)}{2}$$

wherein:

$\rho$ is the distance from the center of the disk to corresponding points on each of said slits;

$\theta_1$ is the angle between a diameter of said disk and a line from the disk center to any point on the first slit;

$\theta_2$ is the angle between said diameter and a line from the disk center to a corresponding point on the second slit; and $\theta_3$ is the angle between said diameter and a line from the disk center to a corresponding point on the third slit.

7. An apparatus as set forth in claim 4, wherein said slits include:

(a) a radial slit lying along the diameter of said disk, and (b) at least two non-radial slits which are symmetrical with respect to the radial slit.

8. An apparatus as set forth in claim 4, wherein said slits are at least four in number and are symmetrical with respect to a diameter of said disk.

References Cited

UNITED STATES PATENTS

| | | | |
|---|---|---|---|
| 3,003,064 | 10/1961 | Astheimer | 250—233 X |
| 3,004,465 | 10/1961 | White | 250—233 X |
| 3,220,298 | 11/1965 | Powell et al. | 250—203 X |
| 3,291,991 | 12/1966 | Welti | 250—233 X |

JAMES W. LAWRENCE, Primary Examiner

C. R. CAMPBELL, Assistant Examiner

U.S. Cl. X.R.

250—233